Oct. 31, 1939.  C. F. KAUNITZ ET AL  2,177,831
WELDING APPARATUS
Filed July 1, 1937   7 Sheets-Sheet 2
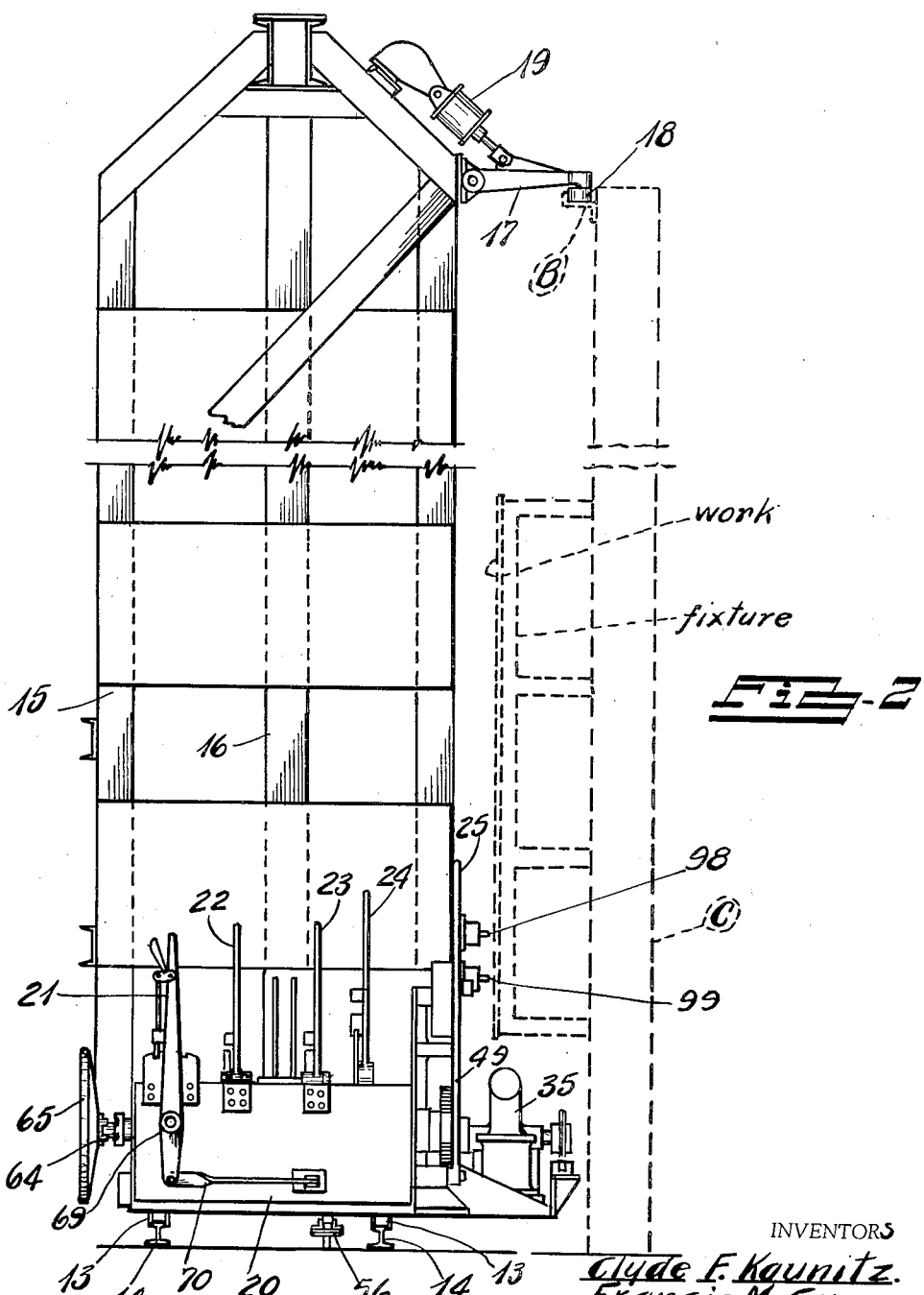
INVENTORS
Clyde F. Kaunitz.
Francis M. Gunn.
Harry S. Boles.
By Frank C. Farman.
ATTORNEY.

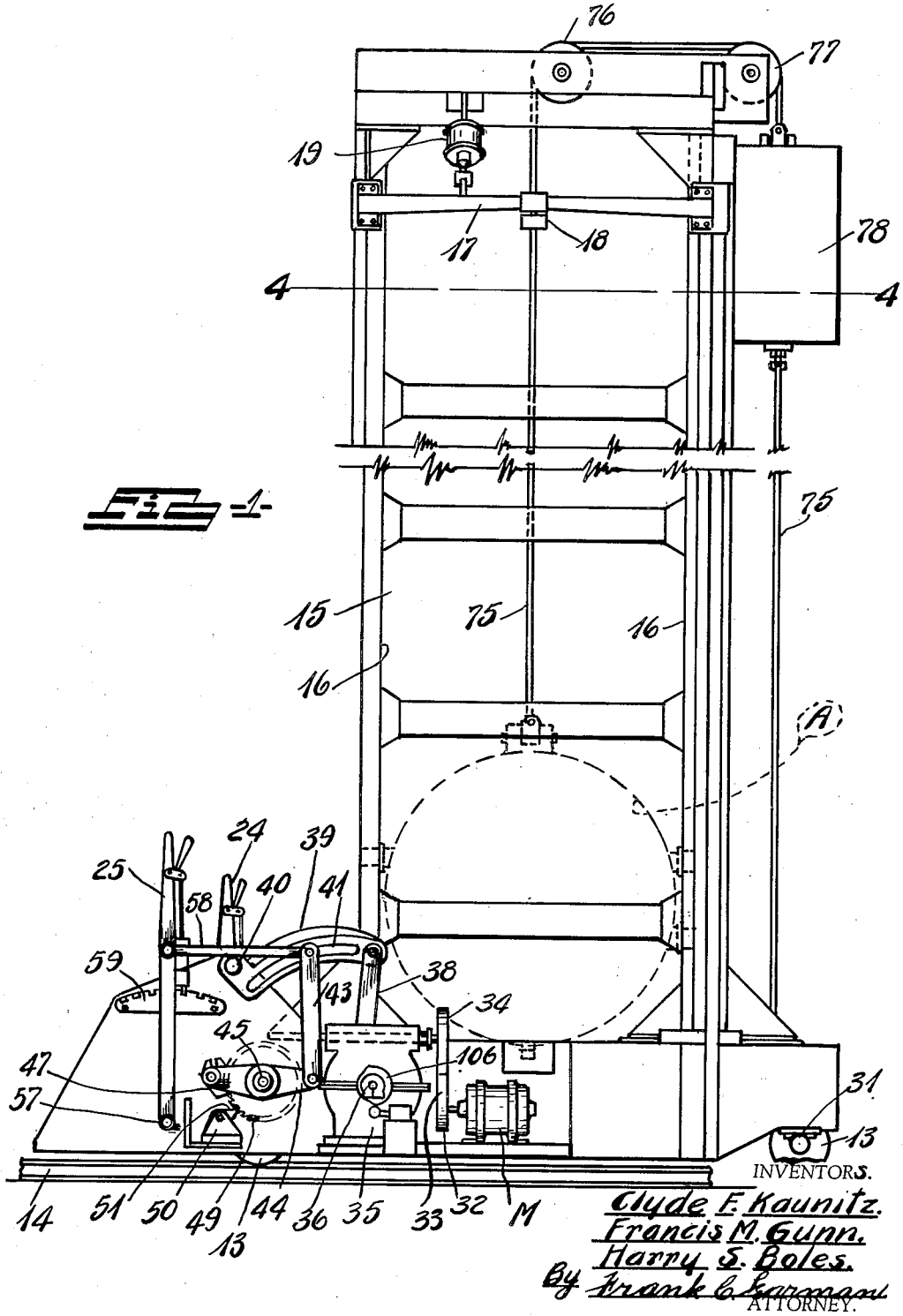

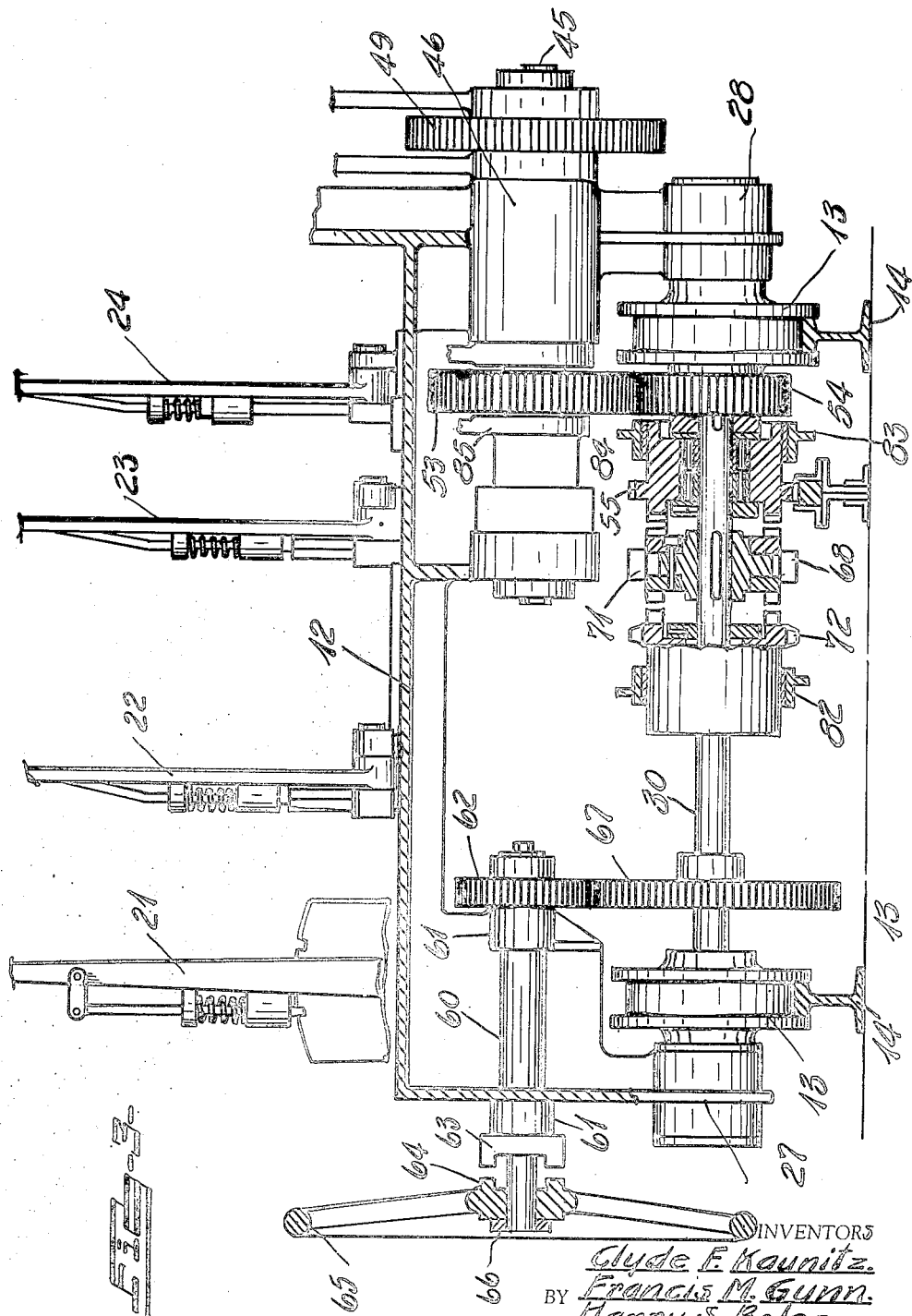

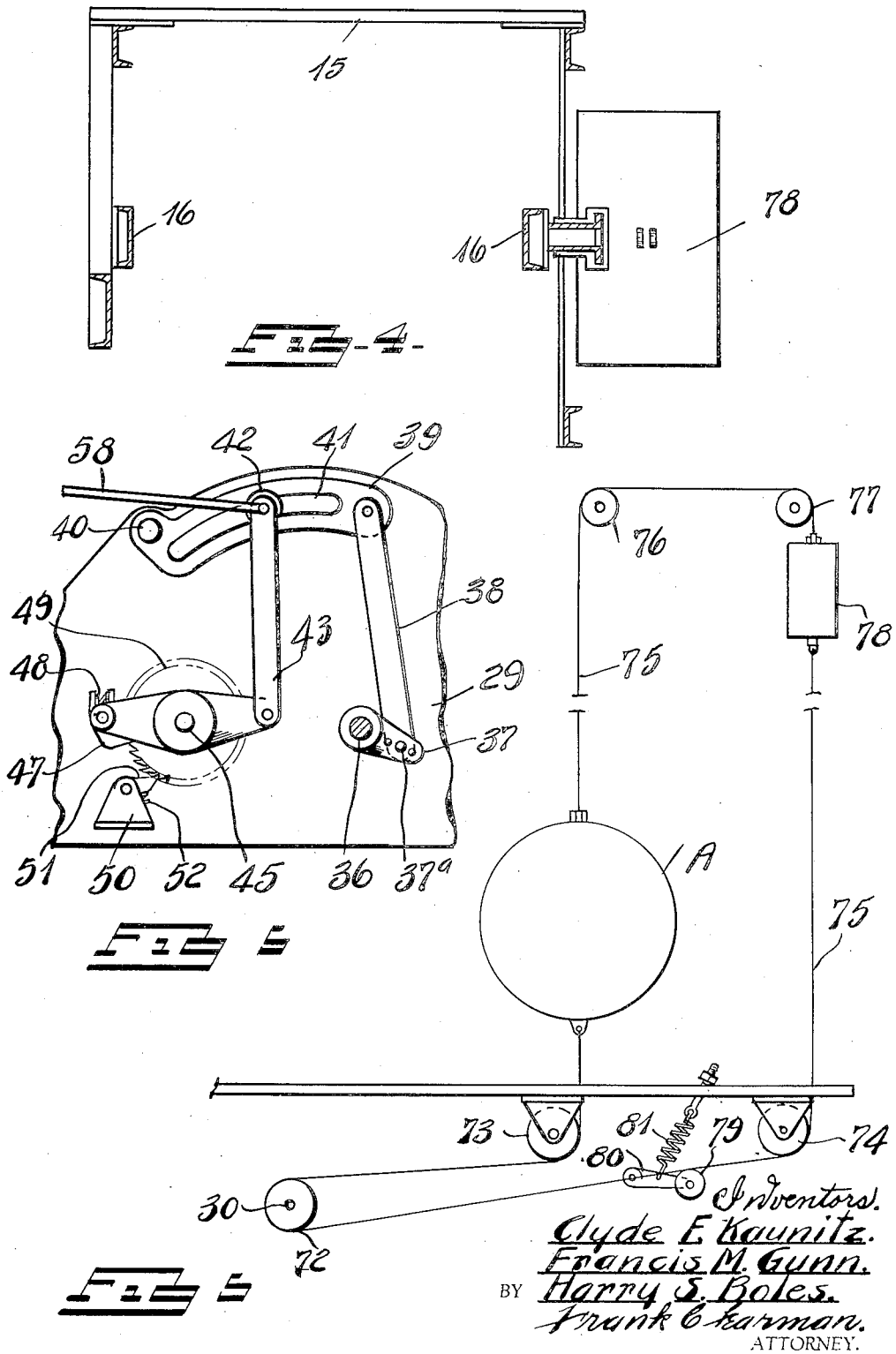

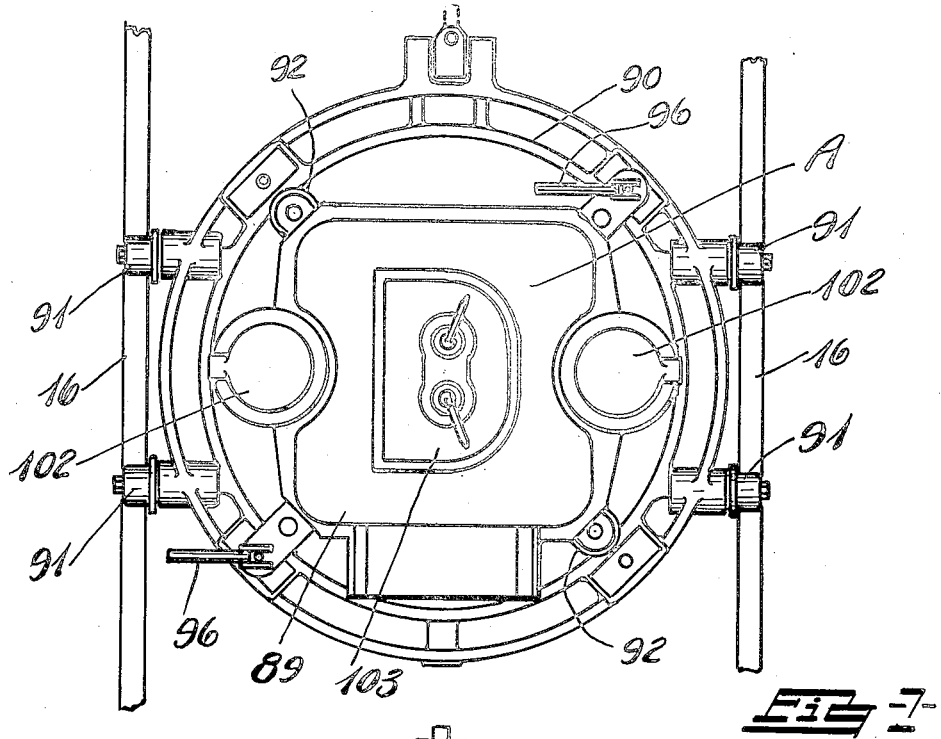
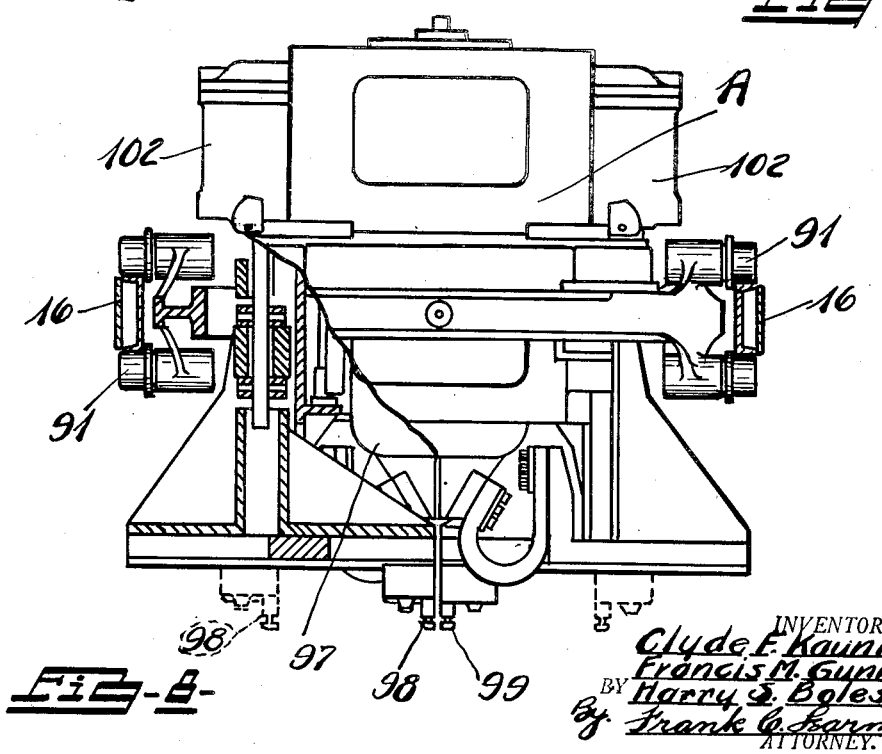

Oct. 31, 1939.    C. F. KAUNITZ ET AL    2,177,831
WELDING APPARATUS
Filed July 1, 1937    7 Sheets-Sheet 6
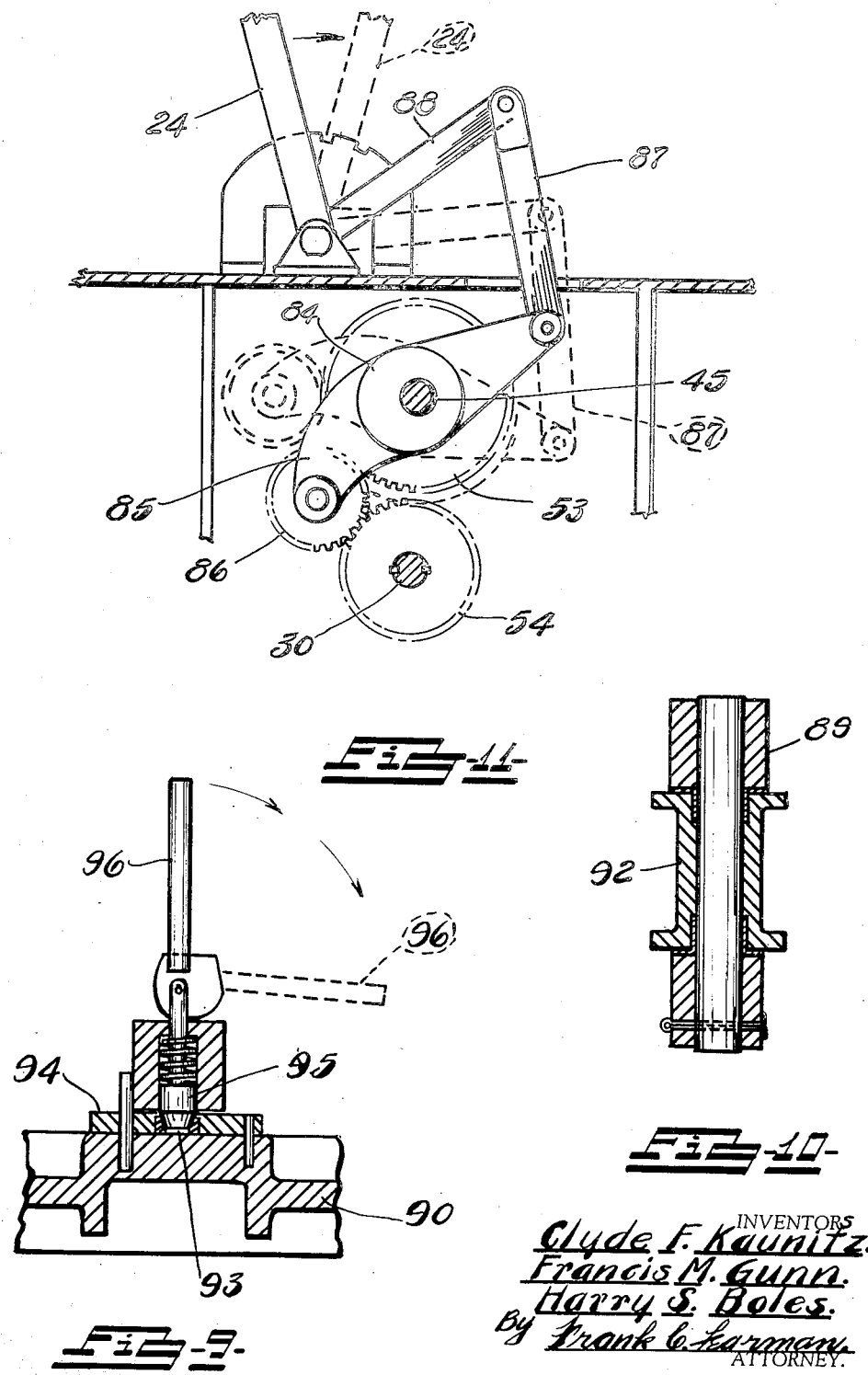
INVENTORS
Clyde F. Kaunitz.
Francis M. Gunn.
Harry S. Boles.
By Frank C. Larman
ATTORNEY.

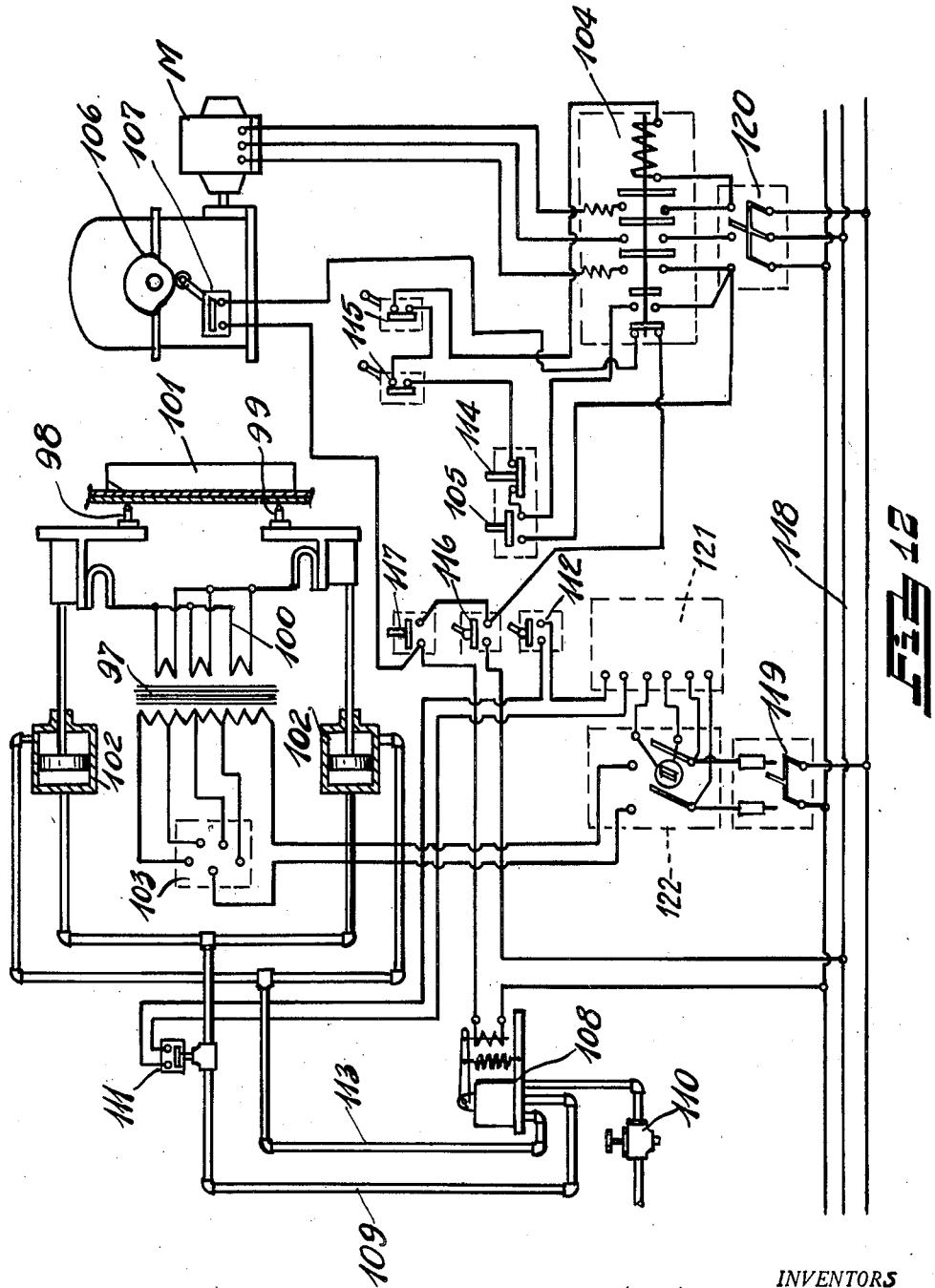

Patented Oct. 31, 1939

2,177,831

UNITED STATES PATENT OFFICE 2,177,831

WELDING APPARATUS

Clyde F. Kaunitz, Bay City, Mich., and Francis M. Gunn and Harry S. Boles, Chicago, Ill.

Application July 1, 1937, Serial No. 151,368

10 Claims. (Cl. 219—4)

This invention relates to apparatus for resistance welding whereby the framework and sheets of steel cars, coaches, tractors, large containers, and railroad equipment in general can be satisfactorily and economically fabricated.

One of the prime objects of the invention is to provide a self-propelled gantry having a welding machine adjustably mounted thereon as a unit for progressively spot welding the horizontal seams and members of a structure as the gantry travels, and provide means whereby the welding unit may travel vertically in the gantry and weld vertical or curved seams and members during said vertical travel.

A further object is to provide simple, practical and readily controllable means for driving the gantry carriage at a predetermined speed, either continuous or intermittently, in a horizontal direction, either straight or curved, as well as means for controlling and regulating continuous or intermittent vertical travel of the welding unit in the gantry.

A still further object is to provide a welding unit adaptable for either continuous or intermittent seam or line welding, as well as spot seam welding, which is defined as an intermittent weld between sheets at definite or adjusted spacings.

A further object still is to provide means for definitely and positively controlling the travel of the gantry and welding machine, as a unit, as well as means for positively controlling the vertical travel and operation of the welding machine with relation to the gantry and the work.

With the above and other objects in view, the present invention consists in the method and combination, hereinafter more fully described, illustrated in the accompanying drawings, and particularly pointed out in the appended claims, it being understood that changes may be made in the form, size, proportion, and details of construction, without departing from the spirit, or sacrificing any of the advantages of the invention.

In the drawings—

Fig. 1 is a side elevational view of the device, the broken lines showing the welding machine in position thereon.

Fig. 2 is an end elevational view, the broken lines showing the fixture support and fixture, with the work in position thereon.

Fig. 3 is an enlarged fragmentary part sectional view of the carriage actuating mechanism.

Fig. 4 is an enlarged sectional plan view taken on the line 4—4 of Fig. 1.

Fig. 5 is a diagrammatic view showing the means for elevating the welding unit.

Fig. 6 is an enlarged fragmentary view of the stroke adjusting mechanism.

Fig. 7 is a side elevational view of the welding unit and the ring in which it is mounted.

Fig. 8 is a part sectional front view thereof, the broken lines showing the electrodes in adjusted positions.

Fig. 9 is an enlarged fragmentary sectional detail showing the means for locking the welding unit in adjusted position, the broken lines showing the lever swung down.

Fig. 10 is an enlarged sectional view of the guide rollers which travel on the welding unit supporting ring.

Fig. 11 is an enlarged detail view of the reversing mechanism, the solid lines showing the mechanism set for travel in one direction, the broken lines showing it set for travel in the opposite direction.

Fig. 12 is a schematic wiring diagram.

Heretofore it has been impracticable to fabricate large structures such as railroad cars, locomotives, etc. by welding, due to the size and the inability, during construction, to bring the "work" to the welding machine, or the welding machine to the "work", and the further impracticability of building a welding machine with a throat or jaw opening sufficient to accommodate work sections of a size used in fabricating articles of the nature described, and we have, therefore, perfected simple, practical, and efficient means whereby the welding machine can be automatically move along the "work", in either horizontal or vertical direction, or to any position necessary to complete the fabricating of railroad cars, houses, and large structures of a similar nature.

Referring now more particularly to the accompanying drawings in which we have shown one embodiment of our invention, the numeral 12 indicates the chassis of a self-propelled carriage provided with wheels 13 which are adapted to engage and travel on tracks 14 which run parallel to the "work".

A superstructure or gantry 15 forms a part of the carriage, and includes spaced apart vertical track or guide members 16, suitably braced to strengthen and reinforce the gantry so that it will accommodate and properly guide the welding machine A which is mounted for vertical travel therein, and while in the present instance we have shown these guides as straight vertical members, it will be understood that they may be curved or otherwise shaped to conform to the contour of the "work".

An overhanging retractable arm 17 is pivotally mounted on the upper end of the gantry 15, and a guide roller 18 is journaled on the end thereof, said roller engaging a Z-bar B or other member which is mounted on stationary supports C or the like, and which assists in resisting the welding pressure load when the welding unit is operated at the extreme high position, this arm and roller being operated by an air cylinder 19 which is controlled from the operator's platform 20 provided on the carriage.

The operation of the carriage and welding unit is controlled from the operator's platform 20 where the control levers 21, 22, 23, 24, and 25 are located so as to be readily accessible to the operator, and by means of which he controls the automatic movement of the carriage along the rails 14 for the horizontal travel of the machine, and the automatic movement of the welding unit on the guides 16 for the vertical travel of said welding unit in the gantry.

Spaced apart bearings 27 and 28 depend from the side walls 29 of the carriage frame and accommodate axle shafts 30 and 31 respectively which are journaled therein, the track engaging wheels 13 being mounted on said axles and traveling on the rails 14 in the usual manner.

The driving mechanism comprises a motor M provided with a drive gear 32 as usual, a drive chain 33 serving to impart motion to a similar gear 34 which is mounted on a speed reduction unit 35. A transversely disposed drive shaft 36 projects from the reduction unit 35, and a crank 37 is mounted thereon, said crank having a plurality of openings 37a, and one end of a link 38 is connected thereto, the opposite end being pivotally connected to one end of a slotted arm 39 which is pivotally mounted on the side wall of the carriage at the point 40, so that a reciprocating motion is imparted to the arm 39 as the crank is driven.

A slot 41 is provided in the arm 39 and is adapted to accommodate a roller 42 which is journaled on the upper end of a link 43 to adjust for carriage or welding unit travel, the opposite end of said link being connected to one end of a rocker member 44 which is journaled on the ratchet wheel shaft 45, which is in turn journaled in bearings 46 provided on the carriage chassis, a pawl 47 being pivotally mounted on the opposite end of said rocker arm, and a spring 48 serving to hold said pawl in engagement with the face of the ratchet wheel 49 which is keyed on the shaft 45.

To lock the ratchet wheel on the return stroke of the rocker arm, we attach a bracket 50 to the side wall of the carriage and pivot another pawl member 51 thereon, a spring 52 serving to hold the pawl in engagement with the toothed face of the ratchet wheel.

A gear 53 is keyed on the ratchet wheel shaft 45, meshing with and driving a gear 54 which is mounted on the drive axle 30 so that said gears are driven as the ratchet wheel is actuated; a gear 55 is also mounted on the axle 30 and engages a rack 56 which is disposed parallel with the tracks 14, and it will be obvious that as this gear is driven that the carriage will be moved accordingly and that the rate of speed is controlled by the adjustment of the lever 38 on the crank 37. The weld spacing is controlled by means of the control lever 25 which is pivotally mounted on the side wall of the carriage at 57, a link 58 being pivotally connected to said control lever and to the upper end of the link 43, so that when said control lever is actuated the roller 42 will be adjusted in said slot, thus decreasing or increasing the length of the stroke, which in turn controls the movement of the rocker arm 44 and regulates the spacing of the weld, a conventional quadrant and locking dog 59 serving to hold the lever 25 in set position.

A manually actuated "setting" or "inching" mechanism is provided for setting the machine in position with relation to the work. It is located on the side of the carriage and is operable to move the carriage or welding unit a limited distance and at very slow speed, and this comprises a shaft 60 which is mounted in bearings 61 provided on the carriage frame, a gear 62 being mounted on the inner end of said shaft, and one section of a jaw clutch 63 is keyed on the outer end thereof, the opposite clutch section 64 being formed integral with a handwheel 65 which is held in position by means of the collar 66, and it will be obvious that when the hand wheel is forced inwardly to engage the clutch, that the "setting" mechanism will be in gear, and that rotation of the hand wheel will rotate the gear 62 and in turn drive the gear 67 which is mounted on the axle shaft 30, thereby "inching" the device on the tracks so that the welding unit may be minutely adjusted with relation to the "work" and for starting automatic sequence.

A clutch mechanism 68 is mounted on the drive axle 30 and is of standard design, said clutch being shiftable into and out of engagement with the gear 55 by means of the clutch lever 21, said lever being pivotally mounted on the carriage at 69, and a link 70 is connected to the member 71 which is secured to the clutch, so that when the lever 21 is actuated, the clutch will be shifted accordingly to shift it into or out of engagement with the gear 55 and control the movement of the carriage on the rails.

Movement for the vertical travel of the welding unit is taken from this same drive shaft 30, the sprocket 72 being mounted thereon, and sprockets 73 and 74 respectively are mounted on the floor of the carriage (see Fig. 5 of the drawings), one end of a chain 75 being pivotally secured to the top side of the ring in which the welding unit is mounted, thence leading up and over the sprocket 76 which is mounted in the gantry, thence leading over a similar sprocket 77 provided on the side of the gantry, and thence being connected to a counterweight 78 as shown, thence the chain connects to the lower side of the counterweight, leading downwardly and around the sprocket 74, thence around the axle sprocket 72, thence around the sprocket 73, and thence being connected to the lower side of the welding unit ring, an idler sprocket 79 being mounted on the pivotally mounted arm 80, and a spring and bolt attachment 81 extends through the floor of the carriage and can be adjusted to tighten the chain as desired; then when the clutch 68 is shifted to engage the sprocket 72, it will be seen that the welding unit will travel vertically in the gantry, the counterweight 78 serving to balance the weight of said welding unit.

Suitable brakes are provided for arresting the travel of the welding unit or the carriage, a brake assembly 82 being provided on the hub of the sprocket 72, said brake being connected to a brake lever 22 which is provided on the carriage, a similar brake assembly 83 being provided on the hub of the sprocket 55, and the brake lever 23 serves to control said brake.

A reversing mechanism (see Fig. 11) is provided for reversing the direction of travel of the carriage or welding unit, and comprises the eccentric sleeves 84 which are mounted in the bearings 46 in which the shaft 45 is journaled; arms 85 are formed integral with these sleeves, and a gear 86 is journaled on the one end thereof, the opposite end being connected to a link 87 which is in turn connected to the leg 88 of the reversing lever 24, and it will be obvious that when this lever is in position as shown in solid lines in Fig. 11 of the drawings, the gears 53, 86, and 54 will be in engagement and drive the mechanism in one direction, and when the lever is shifted to position as shown in broken lines in this same figure, the gears 53 and 54 will mesh and drive the device in the opposite direction. During this latter reversing movement to the dotted line position shown in Figure 11, the eccentric sleeves 84 rotating in bearings 46, Figure 3, will cause the gear 53 to move downwardly into mesh with the gear 54 for driving the shaft 30.

The welding unit A includes a housing 89 mounted in a ring 90 which is provided with spaced apart rollers 91 mounted thereon, so that they engage the guide rails 16 and guide the welding unit in its vertical travel in the gantry, and this welding unit is mounted to permit rotatable adjustment about a horizontal axis, flanged rollers 92 engaging and rolling on the inner edge of the ring 90, and openings 93 are provided in a plate 94, and a spring actuated pin 95 engages in one of said openings, a cam lever 96 being connected to the upper end of the pin 95, and when the cam lever 96 is swung downwardly to horizontal position, the pin 95 disengages from the opening 93, so that the unit can be swung to its desired position, after which the cam lever is again swung vertically to permit the pin to enter the opening 93 and lock the unit in adjusted position.

A welding transformer 97 forms a part of the welding unit, and electrodes 98 and 99 respectively are each adjustably mounted in a holder and connected to one side of the secondary circuit 100 of the welding transformer, and this permits the use of a relatively short strip of copper bar 101 on the opposite side of the "work", which may be integral with the "work" holding fixture or jig for making two spots simultaneously without any conventional long secondary connection connected to this electrode on the opposite side of the "work", and we do not deem it necessary to describe this welding unit in detail, as it is of standard design, and we will merely give sufficient description to enable a clear understanding of the complete unit. It will be noted that the pair of electrodes 98 and 99 are arranged for simultaneous operation on the same side of the work. The series welding is accomplished by one electrode being connected to one end of the transformer coil and the other electrode to the opposite end of the transformer coil so that upon engagement with the same side of the work the circuit is completed. The copper bar 101 on the opposite side of the work is not an electrode. It functions to supplement the work in conducting the current from one electrode to the other.

The electrodes are provided with an in and out stroke through air cylinders 102. They are adjustable for spacing in the conventional manner, and the welding heat is adjustable by means of the usual heat regulator 103.

The electrical control of the automatic operation of the machine is shown schematically in Fig. 12 of the drawings, the magnetic switch 104 being the conventional switch for motor control, and when the machine is in operation, the following sequence is obtained:

The operator first engages the clutch 68 for driving either the welding unit vertically in the gantry or the carriage horizontally on the tracks; he then sets the brake for the stationary position of the opposite travel, the reversing gear lever 24 is then set for the direction of travel, and the machine is now ready for the welding operation. The operator now presses the motor starting button 105, and when the welding unit is stationary, or the pawl ratcheting back on the return stroke of the rocket arm to engage the teeth of the ratchet wheel, the cam 106 on the reduction unit engages a limit switch 107 which operates a four-way solenoid operated air control valve 108, allowing air to enter the top of the cylinders 102 of the welding unit through an air line 109, and forcing the electrodes 98 and 99 into engagement with the "work", and when the predetermined welding pressure, adjustable through pressure regulating valve 110, is exerted, an automatic air line pressure switch 111 closes the welding circuit through the conventional weld snap switch 112. This completes the welding circuit and then breaks it after a predetermined interval, and the weld is made.

In the meantime, the limit switch is actuated by the cam 106 to break the solenoid valve circuit, and the spring on this valve sets it automatically so that air will be exhausted from the top of the cylinder through the air line 113, and pressure to the bottom of the cylinder raises the electrodes from the "work"; the pawl 47 is now engaged with the tooth of the ratchet wheel, moving the welding unit or the carriage to the next point of weld.

The "stop" push button 114 is provided for breaking the motor control circuit, and limit switches 115 are mounted on both the welding unit and the carriage, said switches being actuated at the extreme limit of their respective travel, thereby automatically breaking the motor control circuit and arresting the movement of the welding unit and carriage. A snap switch 112 provides for machine operation without energizing the welding circuit, and the snap switch 116 provides for machine operation without energizing the electrodes, and push button 117 provides for a single welding operation with driving motor and carriage stationary. Power lines 118 supply the necessary current for operation of the machine and welding unit, and disconnecting switches 119 and 120 respectively are interposed between the power lines and the machine for cutting off the current when desired.

Referring to Figure 12 wherein the electric circuits are shown, the electrical control consists essentially of a driving motor M which drives the entire welding carriage through locomotive gearing that imparts an adjustable horizontal inching action to the welding carriage, or by suitable clutch transfer imparts an adjustable vertical inching action to the welding unit.

The motor M runs continuously when in automatic operation and drives a cam 106 through suitable reduction gears designed to give one full revolution of the cam for each complete inching action of either the welding carriage or welding head, depending upon which one is engaged to the driving power. Therefore, cam 106 when properly adjusted closes and opens limit switch 107 to give the proper timing sequence to the welding operation as related to the inching movement of the carriage or of the welding unit. When switch 120 is closed power is furnished from a suitable 3-phase power source 118 to motor starter 104. When motor starter 104 is closed an interlock in series with the limit switch 107 is closed and the following sequence takes place as limit switch 107 opens and closes. Closing limit switch 107 energizes solenoid valve 108 from the power supply 118 providing switch 116 and the interlock in motor starter 104 are closed. Closing of the 4-way air valve 108 exhausts the air pressure from the air line 113 and forces air into the line 109 thereby moving forward the pistons of air cylinders 102 and forcing the electrodes 98 and 99 against the work and against the copper backing bar 101. When full pressure is exerted by the electrodes against the work and against the copper backing bar 101, pressure switch 111 is adjusted to close. Pressure switch 111 is in series with toggle switch 112 and these are across the firing circuit of electronic timer 121. Therefore if pressure switch 111 closes and toggle switch 112 is closed the trip circuit of electronic timer 121 is closed thereby energizing welding contactor 122 for a pre-set timed interval. If switch 119 is closed welding power is supplied from lines 118 to contactor 122. Therefore, if welding contactor 122 is closed welding power will be supplied to welding transformer 97 through the tap changing switch 103. A variable secondary voltage of welding transformer 97 may be obtained by changing the taps on tap switch 103 thereby giving a regulated secondary welding current to welding electrodes 98 and 99. As is shown by the diagram a so-called series weld is then made being from one side of the secondaries 100 of the welding transformer 97, through one spot welding electrode 98, through the work across the copper backing bar 101, through electrode 99, and back to the other side of the transformer secondaries 100. The time period of electronic timer 121 is adjusted so that the welding time is completed before limit switch 107 opens. When switch 107 is again opened by the rotation of cam 106 it opens air valve 108 by deenergizing its solenoid. The air pressure is exhausted from air line 109 and is forced into air line 113 thereby returning the pistons of air cylinders 102 to their original position and withdrawing the electrodes 98 and 99 from the work. This is done to prevent the welding electrodes 98 and 99 from dragging on the work as the welding head or carriage is inched from one stop position to the next. When air pressure is exhausted from air line 109 pressure switch 111 opens thereby resetting the firing circuit of electronic timer 121 ready to be initiated for the next timing period. This operation of the welding electrodes being forced against the work, the weld made and withdrawn is continued automatically as long as motor M is operating and the switch 116 is closed.

When it is desired for set-up or testing purposes to operate either the welding circuit or machine drive independent of one another, the push button 105 or switch 117 (with toggle switch 116 closed) is actuated as desired. Switch 116 opens the control circuit through limit switch 107 thereby breaking the circuit to the air valve 108 and the air pistons of air cylinders 102 which in turn operate electrodes 98 and 99 to and from the work.

Push button 105 is the start button for motor starter 104 and is closed momentarily until the solenoid on 104 is energized closing the switch and holding it in through an interlock. Push button 114 is a stop button, which when momentarily opened breaks the interlock circuit of motor starter 104 thereby opening motor starter 104 and stopping motor M. Limit switches 115 are in series with the solenoid circuit of motor starter 104 and are used as vertical travel safety switches and when opened, open motor starter 104 and stop motor M thereby preventing any additional vertical travel of the welding unit. No means is shown for clearing switch 115 once opened as this is a manual operation accomplished by means of a manually controlled mechanism. Push button 117 is used to close the control circuit across limit switch 107 and the interlock in motor starter 104 thereby giving a manual operation of the solenoid air valve 108 and its subsequent operation of pistons in air cylinders 102 and the resultant closing of air pressure switch 111 and the completion of a welding operation by the firing of electronic timer 121 and the closing of the welding contactor 122. When switch 112 is open the timer is made inoperative and welding contactor 122 will not close. However, the balance of the machine cycle as controlled by limit switch 107 may be operated if switch 116 is closed and the motor is operating, but no welding will be accomplished as no welding power will be applied to welding transformer 97. If switch 116 is open motor M may operate the inching mechanism of the welding unit or carriage without the operation of the welding head governed by cylinder 102. An air regulating valve 110 is provided in the incoming air supply for the purpose of giving a regulated air pressure through air valve 108 to the air cylinders 102 thereby giving a regulated pressure on welding electrodes 98 and 99 against the work and the backing copper block 101.

The piping for the water cooling system is not shown or described, nor are the air lines for supplying air to the moving carriage of the machine, as they form no part of the present invention.

The above described method and apparatus for resistance welding brings the cost of fabricating large articles such as steel cars, houses, etc., within economical limitations, and while spot welding is preferred, it will be understood that continuous welding lines may be formed by merely overlapping the spot welds or by replacing the electrodes with welding rolls (not shown), and providing for continuous feed.

It is obvious that curved objects may be as readily welded as flat objects; it is merely necessary to shape the track to fit the contour of the "work".

What we claim is:

1. In combination, a rail carriage, a gantry mounted thereon, upwardly extending guides in said gantry, a welding unit carriage mounted for up and down movement in said gantry along said guides, a welding device in said carriage and rotatably adjustable about a horizontal axis in said carriage, means for locking said welding device to said carriage, means for supporting said carriage in said gantry, means on said rail carriage for selectively driving said rail carriage and said supporting means for adjusting the welding device horizontally and vertically respectively with respect to the work to be welded, means on said rail carriage for locking said supporting means in the desired elevated position of the welding device, and means on the upper end of said gantry for movably engaging a stationary support associated with the work to be welded.

2. In combination, a rail carriage provided with a platform, a gantry mounted on said carriage, upwardly extending guides in said gantry, a welding device mounted for up and down movement in said gantry along said guides, flexible means for supporting and suspending said welding device in said gantry, a power drive on the carriage, means driven by said power drive for selectively driving said carriage step by step or effecting a step by step adjustment of said welding device along said guides, said means including a step by step rotating driven member and a manually operable member accessible from said platform and adapted to connect said driven member selectively drivingly with said rail carriage or said flexible supporting means, adjustable means for varying the extent of the step by step rotative movements of said driven member, means for reversing the direction of movement of said driven member, means for locking said flexible supporting means when the welding device has been moved into the desired position in the gantry, and means for arresting the carriage, said last named manually adjustable means, reversible means, locking means and arresting means being each manually operable and controllable from said platform.

3. In combination, a rail carriage provided with a platform, a gantry mounted on said rail carriage, upwardly extending guides in said gantry, a carriage mounted for up and down movement in said gantry along said guides, a welding device in said carriage and rotatably adjustable therein about a horizontal axis, flexible means for supporting and suspending said carriage in said gantry, a power drive on said rail carriage, means for selectively driving said rail carriage or said welding device carriage for adjusting said welding device horizontally and vertically respectively with respect to the work to be welded, said means including a driven shaft, a coupling member axially slidably mounted on said shaft, and a manually operable member adapted to connect said coupling member selectively drivingly with said rail carriage and said flexible means; and manually operable means for reversing the direction of movement of said driven shaft, said manually operable member and manually operable means being each accessible from said platform.

4. In a series welding apparatus having a welding head comprising a transformer unit arranged for movement horizontally along the "work" and mounted for up and down travel in the apparatus, a pair of electrodes connected each to one end of the transformer secondary coil and spaced apart and supported for in and out movement for engagement with but one side of the "work", and power means for effecting said engagement.

5. The combination with a track supported welding machine having a vertically movable welding head therein, means for moving said head in parallel relation to the work, a stationary work support to one side of the machine, a controllable holding member for the work support, a transverse holding member guide carried by the work support, said holding member being receivable on said guide.

6. A device as set forth in claim 5 wherein the work support holding device comprises a pivoted arm carried by the welding machine above the welding head, a guide member carried by the stationary work support, means for pivoting said arm towards and away from said work support and guide member and means carried by the arm and adapted to be received on the outside of the guide member carried by the work support and to move thereover.

7. In combination, a rail carriage, a gantry carried by said rail carriage, a stationary work support to one side of said gantry, upwardly extending guides carried by said gantry, a carriage mounted for up and down movement on the guides of the gantry at a constant distance from the work support and work thereon, a welding device in said carriage and rotatably adjustable about a horizontal axis in said carriage, means on said rail carriage for selectively driving said rail carriage or said supporting means for adjusting the welding device transversely and vertically in respect to the work on the work support and means on said rail carriage for locking said supporting means in the desired elevated position of the welding device.

8. A device as set forth in claim 7 including transversely movable interengaging means between the gantry and work suport.

9. A device as set forth in claim 7 including transversely movable interengaging means between the gantry and work support and means for controlling said interengaging means from the rail carriage.

10. In a series welding apparatus having a welding head comprising a transformer unit arranged for movement in a plane parallel to the plane of the "work" upon movement of the apparatus and mounted for movement in the same plane within the apparatus, a pair of electrodes connected each to one end of the transformer secondary coil and spaced apart and supported for in and out movement for engagement with one side of the "work" and power means for effecting said engagement.

CLYDE F. KAUNITZ.
FRANCIS M. GUNN.
HARRY S. BOLES.